(12) United States Patent
Ceriani

(10) Patent No.: US 12,485,486 B2
(45) Date of Patent: Dec. 2, 2025

(54) SYSTEMS AND METHODS FOR AUTOMATIC DETACHMENT OF SUPPORT STRUCTURES FOR 3D PRINTED PARTS

(71) Applicant: Siemens Industry Software Inc., Plano, TX (US)

(72) Inventor: Nicola Maria Ceriani, Erlangen (DE)

(73) Assignee: Siemens Industry Software Inc., Plano, TX (US)

( * ) Notice: Subject to any disclaimer, the term of this patent is extended or adjusted under 35 U.S.C. 154(b) by 770 days.

(21) Appl. No.: 17/637,711

(22) PCT Filed: Aug. 29, 2019

(86) PCT No.: PCT/US2019/048710
§ 371 (c)(1),
(2) Date: Feb. 23, 2022

(87) PCT Pub. No.: WO2021/040712
PCT Pub. Date: Mar. 4, 2021

(65) Prior Publication Data
US 2022/0274178 A1  Sep. 1, 2022

(51) Int. Cl.
*B22F 10/47* (2021.01)
*B22F 10/28* (2021.01)
(Continued)

(52) U.S. Cl.
CPC .............. *B22F 10/47* (2021.01); *B22F 10/28* (2021.01); *B22F 10/43* (2021.01);
(Continued)

(58) Field of Classification Search
CPC .......... B22F 10/47; B22F 10/28; B22F 10/43; B22F 2999/00; B22F 10/40; B33Y 10/00;
(Continued)

(56) References Cited

U.S. PATENT DOCUMENTS 10,254,499 B1 * 4/2019 Cohen .................... G02B 6/50
2015/0066179 A1   3/2015 Stava
(Continued)

FOREIGN PATENT DOCUMENTS

DE   19900597 A1   6/2000
EP     655317 A1 *   5/1995  ......... B29C 67/0092
(Continued)

OTHER PUBLICATIONS

Zhizhou Zhang et al: "Developments in 4D-printing: a review on current smart materials, technologies, and applications", International Journal of Smart and Nano Materials, vol. 10, No. 3, Mar. 19, 2019 (Mar. 19, 2019) pp. 205-224, XP055695226, 20 pages.
(Continued)

*Primary Examiner* — Rebecca Janssen

(57) ABSTRACT

A computing system may include a design access engine configured to access a digital design of a part designed for construction through an additive manufacturing process. The computing system may also include a detachable support structure engine configured to insert, into the digital design, a support structure configured to support construction of a surface of the part. The inserted support structure may include a shape-memory element configured to be in a diminished shape during the additive manufacturing process and expand into an expanded shape after the additive manufacturing process ends as well as an element enclosure attached to the surface of the part and configured to hold the shape-memory element in the diminished shape and break from the part as the shape-memory element expands into the expanded shape.

13 Claims, 8 Drawing Sheets

(51) Int. Cl.
- *B22F 10/43* (2021.01)
- *B33Y 10/00* (2015.01)
- *B33Y 40/20* (2020.01)
- *B33Y 50/02* (2015.01)

(52) U.S. Cl.
CPC ........... *B22F 2999/00* (2013.01); *B33Y 10/00* (2014.12); *B33Y 40/20* (2020.01); *B33Y 50/02* (2014.12)

(58) Field of Classification Search
CPC ......... B33Y 40/20; B33Y 50/02; G06F 30/20; G06F 2113/10; G06F 30/10
See application file for complete search history.

(56) References Cited

U.S. PATENT DOCUMENTS

| | | | |
|---|---|---|---|
| 2016/0370791 A1* | 12/2016 | Revanur | B33Y 50/02 |
| 2020/0009795 A1 | 1/2020 | Gibson et al. | |

FOREIGN PATENT DOCUMENTS

| | | |
|---|---|---|
| RU | 2695684 | 7/2019 |
| WO | 2017078987 A1 | 5/2017 |
| WO | WO-2018154277 A1 * | 8/2018 |
| WO | 2018223043 A1 | 12/2018 |
| WO | 2019055181 A1 | 3/2019 |

OTHER PUBLICATIONS

Saigopal Nelaturi et al: "Automatic Support Removal for Additive Manufacturing Post Processing", arxiv.org, Cornell University Library, 201 Olin Library Cornell University Ithaca, NY 14853, Apr. 27, 2019 (Apr. 27, 2019), XP081267950, 14 pages.

Christopher S. Lefky et al: "Dissolvable Supports in Powder Bed Fusion-Printed Stainless Steel", 3D Printing and Additive Manufacturing, vol. 4, No. 1, Mar. 1, 2017 (Mar. 1, 2017), pp. 3-11, KP055529056, 10 pages.

PCT Search Report dated May 27, 2020, for PCT Application No. PCT/US2019/048710, 15 pages.

Wei Hongqiu et al:"Research status and application prospects of 4D printing shape memorypolymer materials", Chinese Science: Technical Sciences, 01, pp. 2-16, Jan. 20, 2018.

* cited by examiner

SYSTEMS AND METHODS FOR AUTOMATIC DETACHMENT OF SUPPORT STRUCTURES FOR 3D PRINTED PARTS

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design and simulated testing of product structures and product manufacture.

BRIEF DESCRIPTION OF THE DRAWINGS

Certain examples are described in the following detailed description and in reference to the drawings.

DETAILED DESCRIPTION

Additive manufacturing (sometimes referred to as 3-dimensional or 3D printing) may be performed through use of 3D printers that can construct objects on a layer-by-layer basis. Through increasing additive manufacturing capabilities, manufacture of arbitrary and complex product designs has become increasing possible, and part construction through additive manufacturing is becoming increasingly prevalent. Some additive manufacturing techniques use application of a heat or energy source on powder beds to additively construct an object, for example via laser powder bed fusion (LPBF), selective laser melting (SLM), selective laser sintering (SLS), electron beam melting (EBM), and more. Others may use deposition-based technologies, such as through the layered deposition of beads of melted material (e.g., metal) that harden and form a 3D printed part.

In additive manufacturing, one of the challenges is the removal of support structures from the surfaces of 3D printed parts. Support structures may be constructed or otherwise used to assist in the manufacture of a 3D printed part, for example by supporting overhang surfaces or other part portions that require physical reinforcement during manufacture. In some cases (e.g., LPBF and SLM technologies), the support structures themselves may be 3D printed and attached to part surfaces during manufacture, and thus require subsequent removal from the 3D printed part. However, such removal may be difficult. Many current support structure removal processes are performed manually (e.g., with pliers, chisels, etc.) or with machining tools, such as through cutting, milling, drilling, or grinding operations that may require skilled operation of complex (and often costly) tools.

The disclosure herein may provide systems, methods, devices, and logic for automatic detachment of support structures for 3D printed parts. In particular and as described in greater detail herein, the disclosed detachable support structure technology may leverage shape-memory materials and 3D printed enclosures that support the automatic detachment of support structures after construction of a 3D printed part has completed. For instance, shape-memory elements inserted into support structures may change shape upon cooling (or heating), which may cause the inserted shape-memory elements to break the element enclosure. Through such a breaking, detachment of a support structure from a 3D part surface can occur. In some implementations, the described detachable support structures may autonomously detach (e.g., without operator intervention), which may reduce the cost, time, or complexity of support structure removals from 3D printed parts, including for 3D printed parts manufactured through LPBF and SLM technologies.

These and other detachable support structure features and technical benefits are described in greater detail herein.

Figure 1:
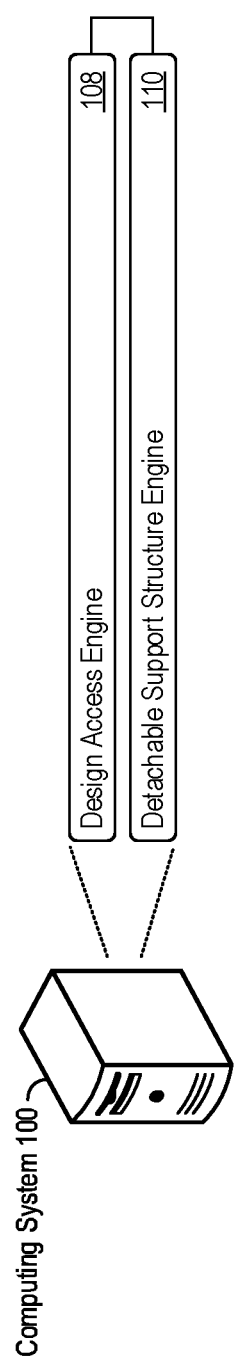
FIG. 1 shows an example of a computing system that supports automatic detachment of support structures for 3D printed parts.

FIG. 1 shows an example of a computing system 100 that supports automatic detachment of support structures for 3D printed parts. The computing system 100 may take the form of a single or multiple computing devices such as application servers, compute nodes, desktop or laptop computers, smart phones or other mobile devices, tablet devices, embedded controllers, and more. In some examples, the computing system 100 is part of or implements (at least in part) a CAD system, a CAM system, a 3D printing system, or any combinations thereof. In that regard, the computing system 100 may support the design, simulation, and manufacture of both 3D printed parts and accompanying support structures.

As an example implementation to support any combination of the detachable support structure features described herein, the computing system 100 shown in FIG. 1 includes an design access engine 108 and a detachable support structure engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the design access engine 108 may access a digital design of a part designed for construction through an additive manufacturing process. In operation, the detachable support structure engine 110 may insert, into the digital design, a support structure configured to support construction of a surface of the part. The inserted support structure may include a shape-memory element configured to be in a diminished shape during the additive manufacturing process and expand into an expanded shape after the additive manufacturing process ends and an element enclosure attached to the surface of the part and configured to hold the shape-memory element in the diminished shape and break from the part as the shape-memory element expands into the expanded shape.

These and other features and technical benefits are described in greater detail next.

Figure 2:
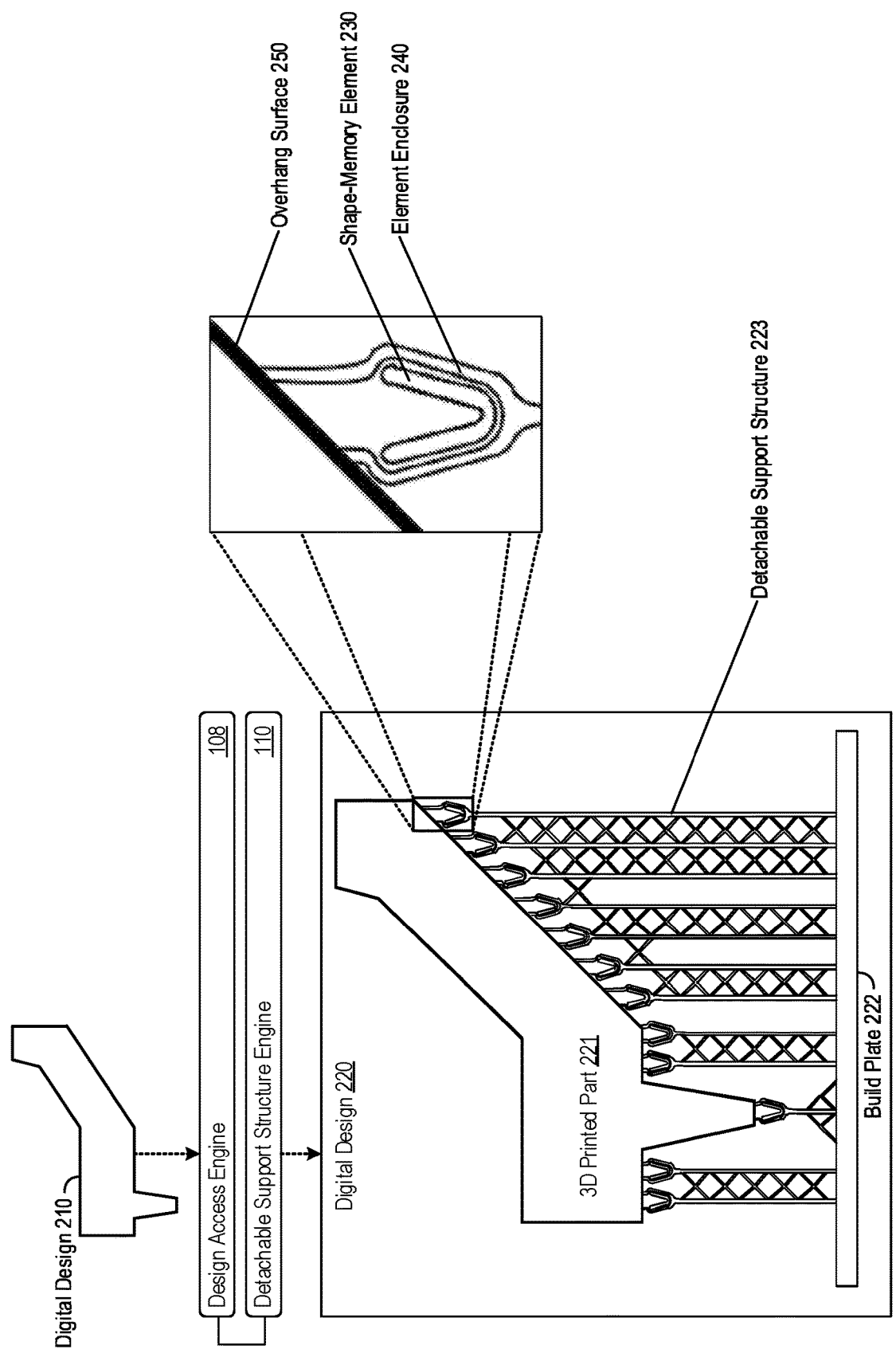
FIG. 2 shows an example of digital design generation by a computing system in support of automatic detachment of support structures for 3D printed parts.

FIG. 2 shows an example of digital design generation by a computing system in support of automatic detachment of support structures for 3D printed parts. In the particular example shown in FIG. 2, a computing system is illustrated in the form of a design access engine 108 and a detachable support structure engine 110. However, other system implementations are contemplated herein.

The design access engine 108 may access a digital design 210 of a part designed for construction through additive manufacturing. A digital design 210 may include any 3D representation of a part, any type of part design data, any type of part manufacture data, and the like. As examples, the digital design 210 may be a CAD model, surface mesh, 3D geometry, boundary representation, or other digital representation of a part. In some implementations, the design access engine 108 may access the digital design 210 by opening or loading CAD files or other design files from a system memory.

The detachable support structure engine 110 may provide capabilities to digitally represent support structures used in the manufacture of a 3D printed part in part designs. In that regard, the detachable support structure engine 110 may augment or otherwise modify the digital design 210 to digitally represent any of the detachable support structures described herein. In the example shown in FIG. 2, the detachable support structure engine 110 modifies the digital design 210 accessed by the design access engine 108 into the digital design 220. Put another way, the detachable support structure engine 110 may generate the digital design 220, and do so by including detachable support structures for a part design specified through the digital design 210.

The digital design 220 shown in FIG. 2 includes various digital representations of physical components of a part design, including digital representations of a 3D printed part 221, a build plate 222 (e.g., in a 3D printing system), and various detachable support structures such as the one labeled in FIG. 2 as the detachable support structure 223. In generating the digital design 220, the detachable support structure engine 110 may insert support structures into the digital design 220 at various positions to support manufacture of the 3D printed part 221. In particular, the detachable support structure engine 110 may insert detachable support structures at determined overhang faces, which may refer to faces of the 3D printed part 221 angled beyond a threshold limit and may thus require physical support for proper manufacture. The detachable support structures represented by the detachable support structure engine 110 in the digital design 220 may have the capability to automatically detach after physical manufacture.

To illustrate, a selected portion of the detachable support structure 223 in FIG. 2 is depicted in greater detail that includes a shape-memory element 230 as well as an element enclosure 240 that is attached to an overhang surface 250 of the 3D printed part 221. As described in greater detail herein, the shape-memory element 230 may expand after physical manufacture, for example upon cooling to a lower temperature after additive manufacture of the 3D printed part 221 and accompanying support structures has completed. The element enclosure 240 inserted by the detachable support structure engine 110 may comprise a particular portion of the detachable support structure 223 that holds in position or otherwise encapsulates the shape-memory element 230.

In some examples, the detachable support structure engine 110 may control the detachment of the detachable support structure 223 from the 3D printed part 221 via the design of the element enclosure 240. For instance, the element enclosure 240 may be designed to break upon expansion of the shape-memory element 230 (e.g., at break points in the element enclosure 240), thus detaching the detachable support structure 223 from 3D printed part 221. Break points may be configured, designed, or inserted by the detachable support structure engine 110 to include weakened structures in the element enclosure 240. Such weakened structures may include any mechanical or structural element of the element enclosure 240 that supports a controlled breaking of the element enclosure 240 at a break point. The detachable support structure engine 110 may position weakened structures at contact points (and eventually break points) between the element enclosure 240 and the shape-memory element 230 as the shape-memory element 230 expands, thus support control of the breaking of the element enclosure 240 from the surface of the 3D printed part 221.

In some examples, the weakened structure may include a perforated lining at the contact point/break point such that the element enclosure 240 is configured to break along the perforated lining as the shape-memory element 230 expands. Other implementation examples may include a thinned metal section (as compared to the metal thickness of other portions of the element enclosure 240), hourglass shaping, structural weak points, or any other mechanical design which may compel the element enclosure 240 to break in a controlled manner (e.g., in a straight break line or with reduced amount of required breaking force). As such, the detachable support structure engine 110 may implement support structure designs that can detachably break from a 3D printed part through element enclosures and shape-memory elements.

In some implementations, the detachable support structure engine 110 may position the element enclosure 240 of the detachable support structure 223 to be proximate (e.g., "close") to a part surface. The detachable support structure 223 may do so to reduce a residue portion of the element enclosure 240 that may remain after the shape-memory element 230 breaks the element enclosure 240 to detach the detachable support structure 223 from the 3D printed part 221. One way of such a proximate positioning of element enclosure may be achieved through application of a threshold proximity criterion, e.g., in the form of a threshold proximity distance.

In applying a threshold proximity distance, the detachable support structure engine 110 may configure positioning of the element enclosure 240 in the digital design 220 such that at least a portion of an inserted shape-memory element 230 is less than the threshold proximity distance (e.g., within 2.1 millimeters) from a portion of a part surface (in this case, the overhang surface 250). As another example, the detachable support structure engine 110 may position the element enclosure 240 such that a distance between a selected portion of the element enclosure 240 (e.g., a break point of the element enclosure 240) and the overhang surface 250 is minimized or within the threshold proximity distance.

Accordingly, the detachable support structure engine 110 may generate digital designs of 3D parts that include automatically detachable support structures as disclosed herein. In some implementations, the detachable support structure engine 110 implements such features as part of a CAD, CAM, or CAx application to support digital design and simulated manufacture of 3D parts. Additionally or alternatively, the detachable support structure engine 110 may have the capability to control physical manufacture of the 3D printed part 221 and detachable support structures, e.g., by generating machine programs or printing instructions for 3D printing systems to guide construction of the detachable support structures described herein.

Figure 3:
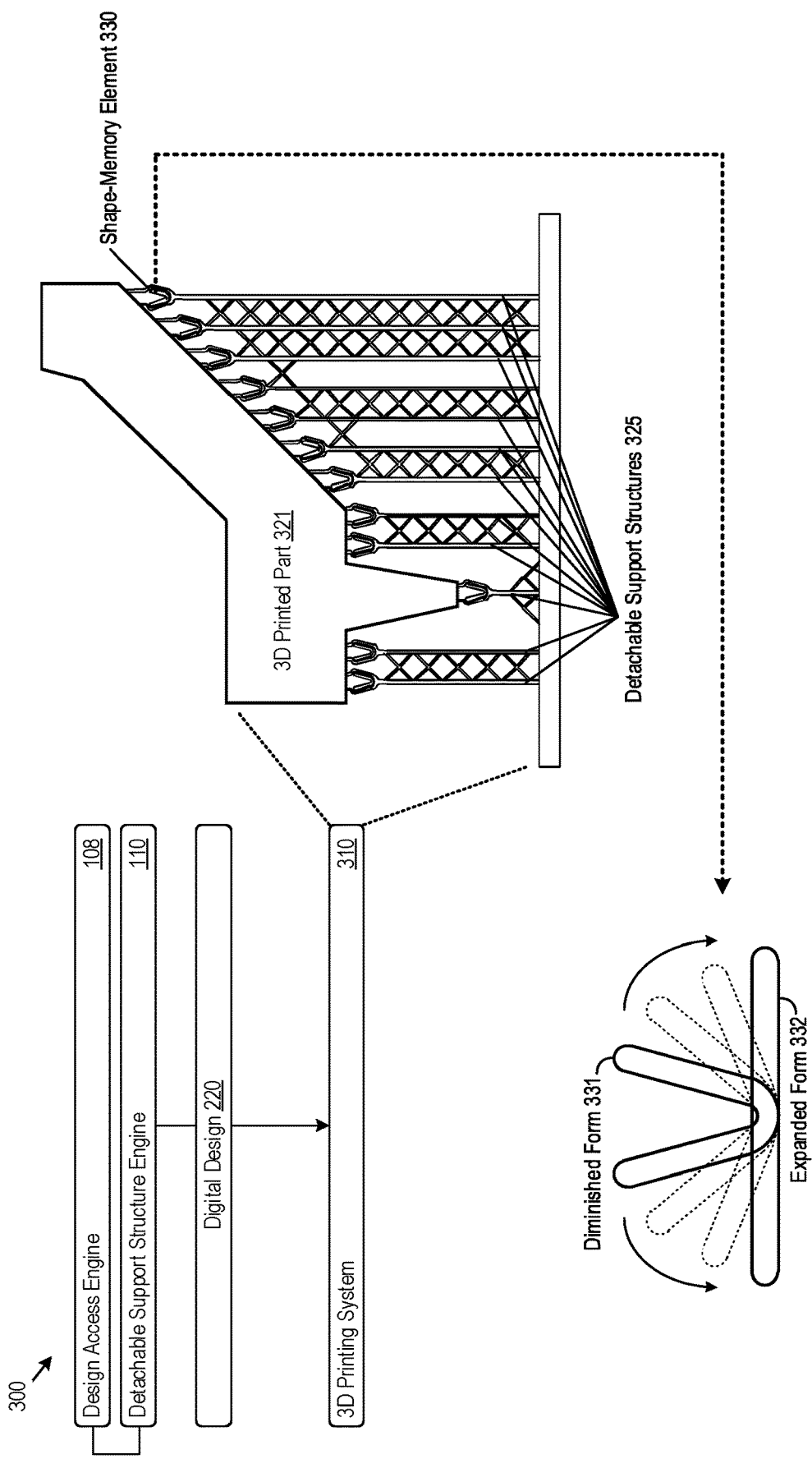
FIG. 3 shows an example of a system that supports construction of detachable support structures that can automatically detach from a 3D printed part through shape-memory elements.

FIG. 3 shows an example of a system 300 that supports construction of detachable support structures that can automatically detach from a 3D printed part through shape-memory elements. The system 300 in FIG. 3 includes a design access engine 108 and a detachable support structure engine 110 (which may be together implemented via a computing system) as well as a 3D printing system 310.

The 3D printing system 310 may include any components that support construction of a physical part through additive manufacture, and may thus include 3D printer components, machining tools, powder dispensers, build plates, and the like. The 3D printing system 310 may also include various computing capabilities to interpret digital designs of 3D printed parts (which may include accompanying support structures). As such, the 3D printing system 310 may include a build processor, e.g., to support computations for part slicing, hatch tracking determinations for laser pathing, and other computations to control physical manufacture of 3D parts. In some instances, the 3D printing system 310 may implement any of the capabilities of the detachable support structure engine 110, allowing computations and CAD/CAM designs to occur locally at the 3D printing system 310. Explained in a different way, the detachable support structure engine 110 may be implemented (at least in part) via a combination of hardware and software of the 3D printing system 310.

The 3D printing system 310 may access a digital design 220 generated to include detachable support structures (e.g., digital representations thereof). Then, the 3D printing system 310 may manufacture 3D parts through additive manufacturing processes in accordance with the digital design 220. That is, the 3D printing system 310 may physically construct 3D parts and any of the detachable support structures as described herein.

As shown in FIG. 3, the 3D printing system 310 may construct physical representations of elements digitally represented in the digital design 220. That is, the 3D printing system 310 may physically construct the 3D printed part 321 (e.g., via LPBF or SLS processes). The additive manufacturing process performed by the 3D printing system 310 may also include construction of the detachable support structures 325 to support manufacture of the 3D printed part 321. Physical construction of a given support structure may include constructing an element enclosure via an additive manufacturing process and inserting a shape-memory element into the element enclosure during construction of the element enclosure. Example features of these construction processes are described in greater detail below.

Upon completing the additive manufacturing process, the 3D printed part 321 may be physically suspended by the detachable support structures 325 constructed via the additive manufacturing process used to construct the 3D printed part 321. These detachable support structures 325 may automatically detach from the 3D printed part 321 via inserted shape-memory elements and constructed element enclosures. Example capabilities of a shape-memory element is shown in FIG. 3 through the shape-memory element 330, which may be inserted into a given detachable support structure during manufacture of the 3D printed part 321.

The shape-memory element 330 may be any physical component that can change into different shapes. For instance, the shape-memory element 330 may be constructed using a 2-way shape-memory alloy that is trained to learn different physical forms at different temperatures (e.g., in a heated state and in a cooled state). As an illustrative example, the shape-memory element 330 may be configured to be in a diminished form 331 in a heated state, such when heated to a specific temperature or temperature range (e.g., 200°-300° Celsius). As the shape-memory element 330 cools, it may change shape and eventually transition into an expanded form 332 upon reaching a cooled state (e.g., less than 100° Celsius).

Although illustrated in a V-shape in various examples herein, the detachable support structure engine 110 and 3D printing system 310 may support design and use of shape-memory elements in any other shapes or geometry such that the shape-memory element can be physically formed into a diminished form in a first state and expanded into an expanded form in a second state. As examples, shape-memory elements inserted into detachable support structures may be in a spring or spiral shape that are compressed into a diminished form in a heated state and that uncoil into an expanded state upon cooling.

As yet another implementation example, the shape-memory element 330 inserted by the 3D printing system 310 may be in a diminished form 331 in a cooled state (e.g., during part manufacture at 200°-300° Celsius). In such examples, the shape-memory element 330 may transform into an expanded form 332 upon heating, thus causing at least one of the detachable support structures 325 to automatically and autonomously detach from the 3D printed part 321. Such an implementation may be useful when a 3D printed part 321 undergoes heat treatment (e.g., to greater than 400° Celsius) after manufacture via post-manufacture part processing. In the context of an (potentially already existing) post-manufacture process, the detachable support structures 325 may have the capability to automatically detach, thus supporting removal of constructed support structures with increased ease and efficiency.

As noted herein, a shape-memory element may expand and break an element enclosure after manufacture of a 3D printed part. Example features of such an automatic detachment process are described in greater detail next in connection with FIG. 4.

Figure 4:
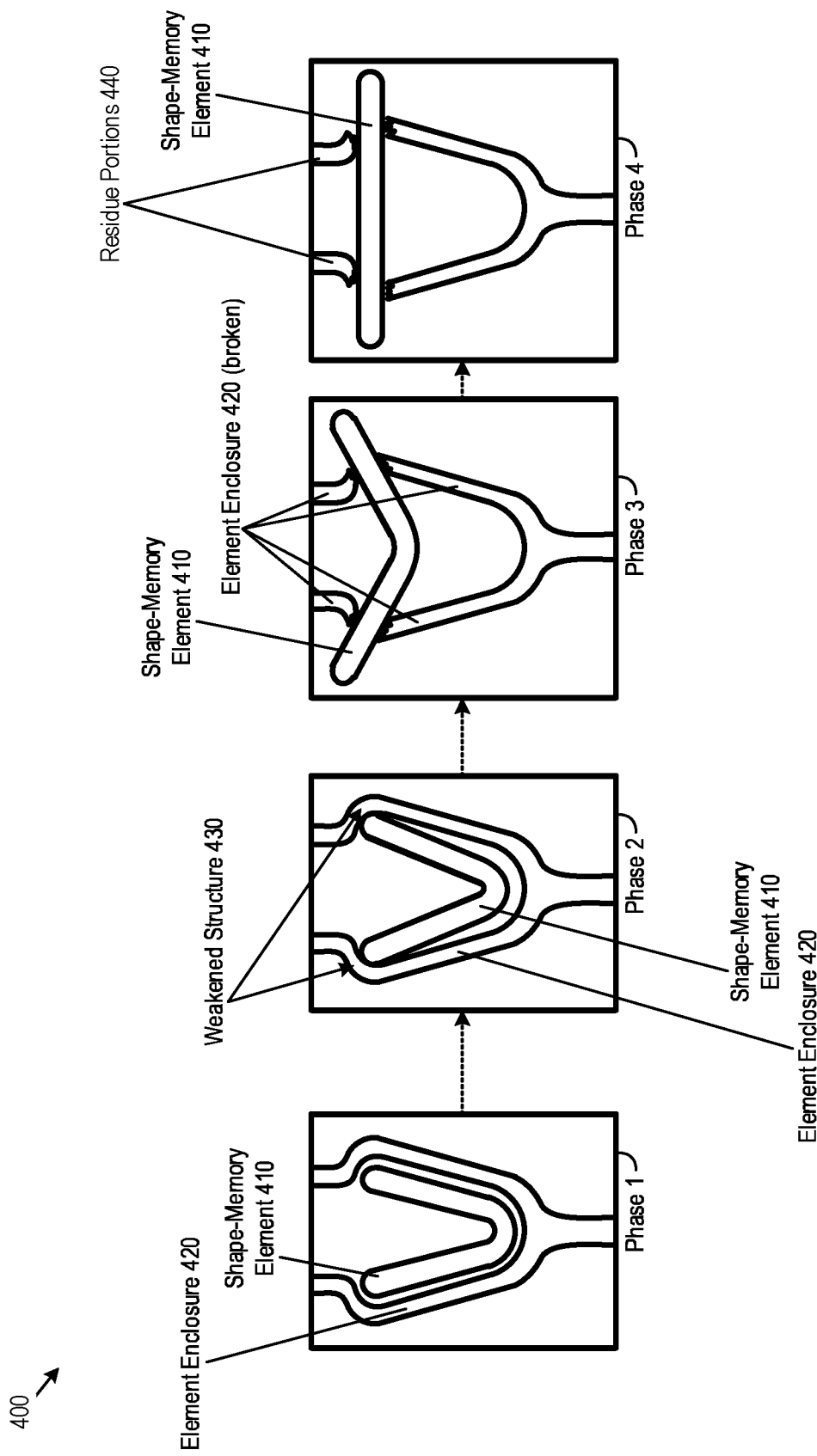
FIG. 4 shows an example of an automatic detachment process by a detachable support structure that includes a shape-memory element and an element enclosure.

FIG. 4 shows an example of an automatic detachment process 400 by a detachable support structure that includes a shape-memory element 410 and an element enclosure 420. In particular, FIG. 4 illustrates four (4) different snapshots in time of an example automatic detachment process 400, labeled as phases 1-4 respectively. The example shape-memory element 410 shown in FIG. 4 is in a V-shape, but various other types of shape-memory elements are contemplated herein.

In phase 1, the shape-memory element 410 may be positioned (e.g., enclosed) within the element enclosure 420 and in a diminished form. As such, phase 1 may occur during or after physical manufacture of a 3D printed part and accompanying detachable support structures. After physical manufacture and as the shape-memory element 410 cools (or, alternatively, is heated via post-manufacture processing), the shape of the shape-memory element 410 may transition into a different form.

In phase 2, the shape-memory element 410 may expand and eventually physically contact the element enclosure 420. The point at which the shape-memory element 410 contacts the element enclosure 420 may be referred to as a contact point (which may eventually become a break point, though a break point may be designed elsewhere in the element enclosure 420 as well). As noted herein, the detachable support structure engine 110 may design element enclosures and the 3D printing system 310 may additively manufacture element enclosures to support a controlled detachment of support structures from 3D printed parts. As such, the element enclosure 420 (e.g., designed by the detachable support structure engine 110 and 3D-printed by the 3D printing system 310) may include weakened structures 430 at the contact points. The weakened structures 430 may take various forms, such as perforated lining, reduced metal layers/thickness, or any other suitable physical structure to guide the breaking of the element enclosure 420 as the shape-memory element 410 expands.

In phase 3, the shape-memory element 410 may expand to break the element enclosure 420. As seen in FIG. 4, the element enclosure 420 may break in phase 3 as the shape-memory element 410 expands in a manner that extends beyond the enclosed space of the element enclosure 420. As such, the expansion of the shape-memory element 410 into an expanded form may forcibly break the element enclosure 420 into different pieces by which a support structure may automatically detach from the surface of a 3D printed part. The point at which the element enclosure 420 breaks via expansion of the shape-memory element 410 may be referred to as a break point, which may be the same as or different from contact points between the shape-memory element 410 and the element enclosure 420.

In phase 4, the shape-memory element 410 may complete its transition into an expanded form (e.g., fully extended as shown in FIG. 4). Note that in FIG. 4, portions of the element enclosure 420 may still be attached to the surface of a 3D printed part even after the element enclosure 420 breaks due to expansion of the shape-memory element 410. Such portions of the element enclosure 420 are labeled as the residue portions 440. As described herein, the detachable support structure engine 110 may configure a design of the element enclosure 420 to reduce (e.g., minimize) the residue portions 440 of an element enclosure 420 that remain affixed to a part surface after the automatic detachment process 400 completes.

In some implementations, the detachable support structure engine 110 may configure a design of a detachable support structure such that the residue portions 440 of the element enclosure 420 can be removed from a part surface via post-manufacture processing. Example post-manufacture processes may include chemical treatment applications, sand blasting, vibration processing (e.g., with small metallic balls in an enclosed chamber), and the like. Such post-manufacture process may be generally applied to a 3D printed part, and may refer to processes that are distinct from specifically-designed support structure removal processes whether performed manually (e.g., with pliers, chisels, etc.) or with machining tools, such as through cutting, milling, drilling, or grinding operations. That is, detachable support structures as described herein may leave a residue portion 440 that is more easily and efficiently removed as compared to conventional support structure removal processes that can be costly and complicated.

As such, detachable support structures may be designed, constructed, and used to support automatic support structure detachment for 3D printed parts with increased ease and efficiency. Some example features with regards to construction of detachable support structures are described in greater detail next.

Figure 5:
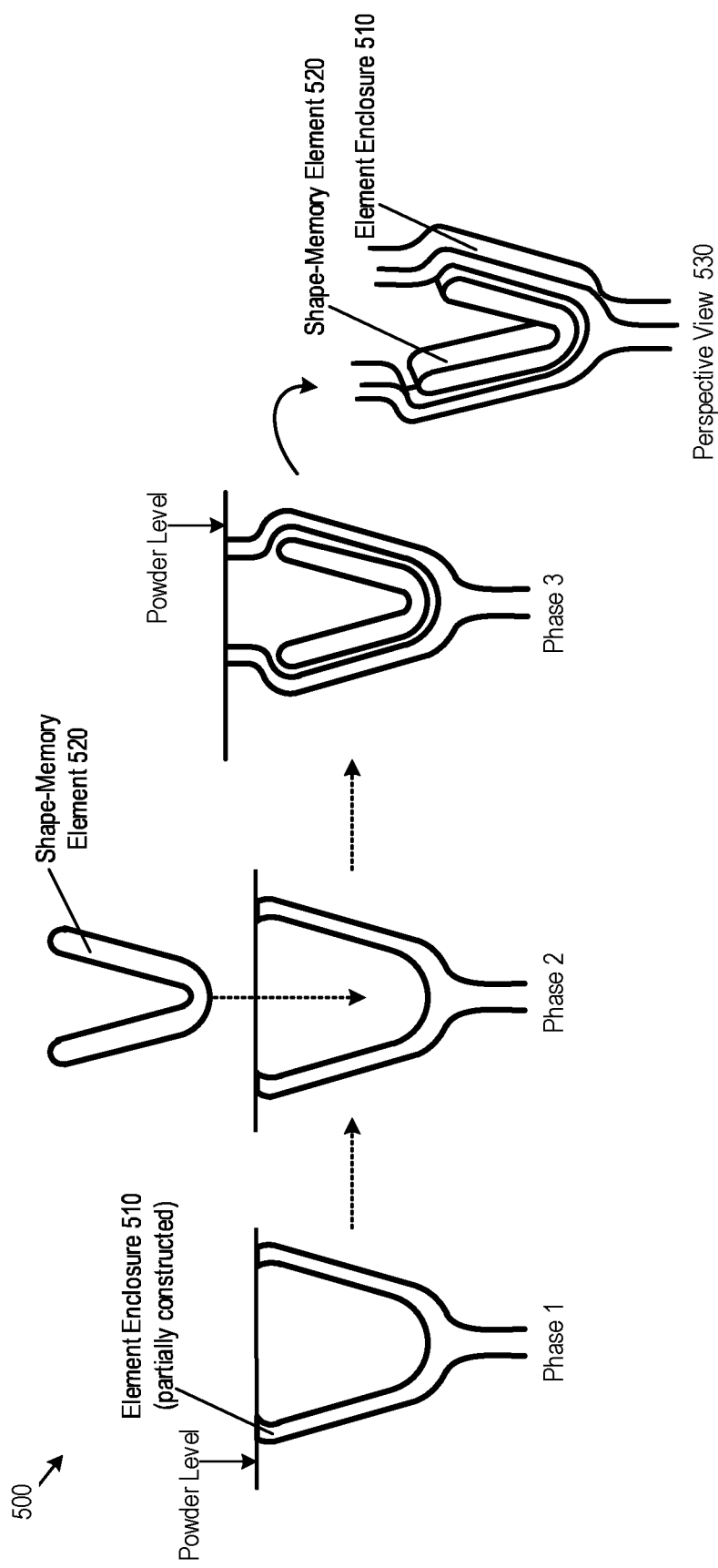
FIG. 5 shows an example of a construction process by which a 3D printing system may construct a detachable support structure that includes an element enclosure and shape-memory element.

FIG. 5 shows an example of a construction process 500 by which a 3D printing system may construct a detachable support structure that includes an element enclosure 510 and shape-memory element 520. In particular, FIG. 5 illustrates three (3) different snapshots in time of an example construction process 500 performed for LPBF or SLS manufacturing technologies, and the snapshots are labeled as phases 1-3 respectively. The construction process 500 may be configured or arranged by the detachable support structure engine 110 (e.g., as 3D printing instructions), executed or performed by a 3D printing system 310, or any combination thereof. The example shape-memory element 520 shown in FIG. 5 is in a V-shape, but various other types of shape-memory elements are contemplated herein. Other additive manufacturing technologies besides LPBF and SLS are contemplated herein as well.

In constructing a detachable support structure, a 3D printing system may manufacture, in part, the element enclosure 510 as shown in phase 1. In particular, the 3D printing system may partially construct the element enclosure 510 to a predetermined degree to support insertion of a shape-memory element. Partial construction of the element enclosure 510 in phase 1 may complete when the 3D build process has reached a predetermined layer (or other configurable point in an additive manufacture process). In some implementations, the predetermined layer may be identified or specified through 3D printing instructions generated by a detachable support structure engine 110 to control and additive manufacture process, and the 3D printing instructions may include insertion instructions to pause the additive manufacturing process when reaching the predetermined layer (e.g., pause at layer 251 in the additive manufacture process for shape-memory element insertion).

The predetermined layer specified by the detachable support structure engine 110 may correspond to a point in the additive manufacturing process at which a shape-memory element can be inserted into the partially-constructed element enclosure 510 without interfering with subsequent additive manufacture of remaining portions of the element enclosure 510. As such, the predetermined layer at which an additive manufacturing process pauses (and a shape-memory element can be inserted) may be determined by the detachable support structure engine 110 to be when the powder level or constructed portion of the element enclosure 510 has a height that is higher (along a build direction) than an inserted shape-memory element.

In some implementations, the predetermined layer at which additive manufacture of the partially-constructed element enclosure 510 pauses for shape-memory element insertion is at least a predetermined number of layers higher than the height of an inserted shape-memory element. The detachable support structure engine 110 and 3D printing system may enforce such a threshold layer difference to reduce, minimize, or eliminate the effect of energy applications in LPBF or SLS processes on metal powder layers below a present layer. Doing so may reduce or prevent inadvertent or unintentional fusing of metal powder to an inserted shape-memory element. As such, the predetermined layer at which additive manufacture pauses may be computed through statistical models of thermal energy impacts, metal powder characteristics, and according to various other factors to ensure proper construction of the detachable support structure.

After partial construction of the element enclosure 510 in phase 1, the 3D printing system may insert the shape-memory element 520 into a detachable support structure in phase 2. In particular, the 3D printing system may insert the shape-memory element 520 into a partially constructed element enclosure 510 such that the shape-memory element 520 is held by the element enclosure 510 in a predetermined position. The partially-constructed element enclosure 510 may include an opening of sufficient size for insertion of the shape-memory element 520 as well as cavity within which the shape-memory element 520 may fit into the element enclosure 510.

As noted above, the element enclosure 510 may be sufficiently constructed such that the shape-memory element 520 does not exceed the height of the element enclosure 510, and thus additive manufacture of the unbuilt portion of the element enclosure 510 may continue and be completed without thermal or physical impact on the shape-memory element 520. Phase 2 may, in some sense, represent a pause in successive layers of an additive manufacturing process in order to insert the shape-memory element 520 into the partially-constructed element enclosure 510.

After insertion of the shape-memory element 520 in phase 2, the 3D printing system may continue construction of the element enclosure 510 in phase 3 until completion. As such, a 3D printing system may support insertion of the shape-memory element 520 during construction of the element enclosure 510, which may result in a detachable support structure according to the present disclosure. As shown in FIG. 5, a perspective view 530 of a detachable support structure that includes the element enclosure 510 and the shape-memory element 520 is illustrated as well.

As noted herein, a detachable support structure engine 110 may generate 3D printing instructions for a 3D printing system to physically construct detachable support structures via insertion of shape-memory elements. An example of such a system is described next in connection with FIG. 6.

Figure 6:
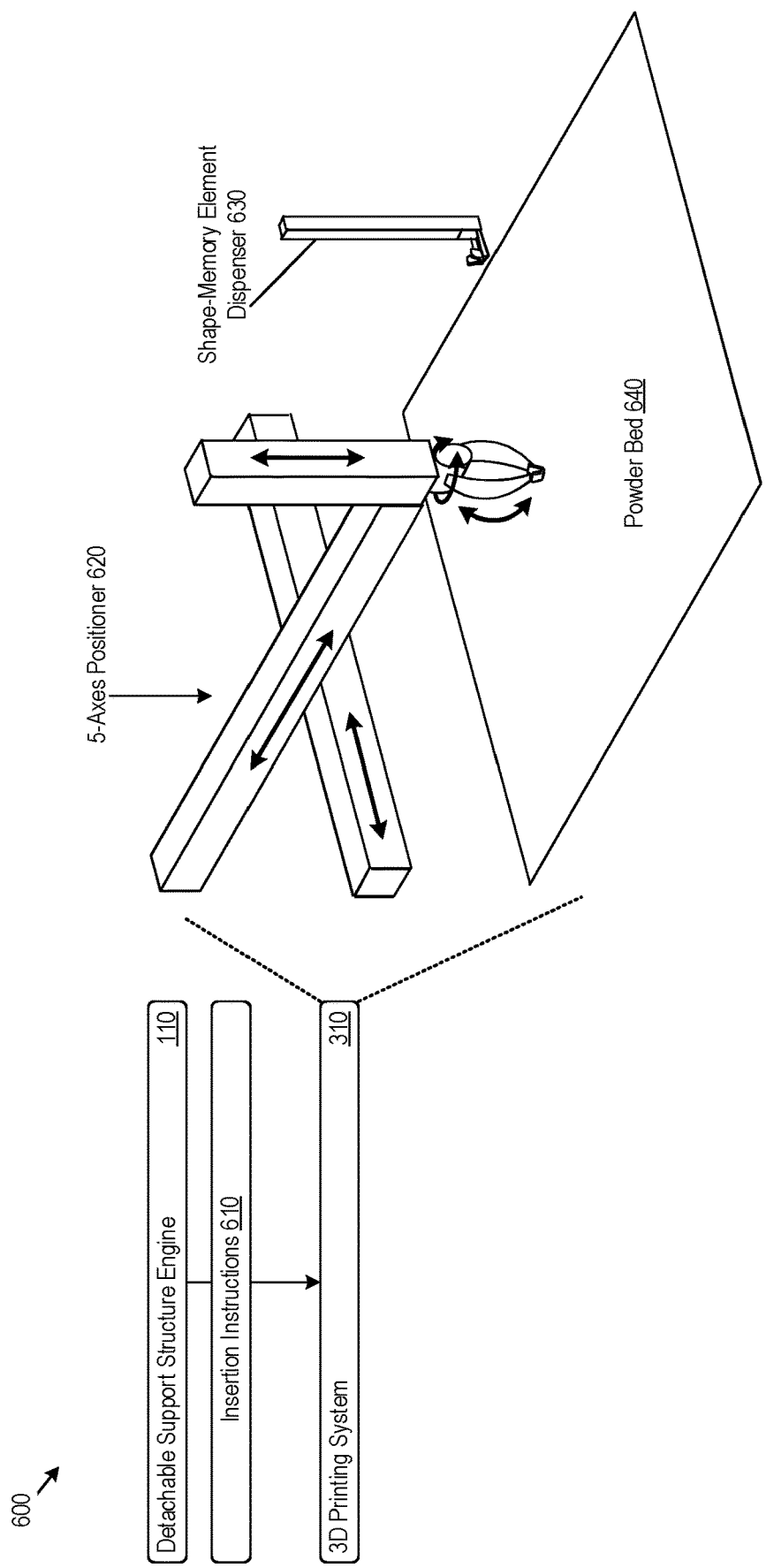
FIG. 6 shows an example of a system that supports insertion of shape-memory elements during an additive manufacturing process.

FIG. 6 shows an example of a system 600 that supports insertion of shape-memory elements during an additive manufacturing process. The system 600 in FIG. 6 includes the detachable support structure engine 110, which may be implemented at least in part via a CAD or CAM application, as well as a 3D printing system 310. The detachable support structure engine 110 may generate insertion instructions 610 to guide or otherwise control the 3D printing system 310 to insert shape-memory elements during additive manufacture of a part. Such insertion instructions 610 may be part of a set of 3D printing instructions that the detachable support structure engine 110 may generate to control and guide an additive manufacture process performed by the 3D printing system 310.

The insertion instructions 610 may control specific components of the 3D printing system 310 to insert shape-memory elements at predetermined layers or points of the additive manufacturing process. As one example implementation shown in FIG. 6, the 3D printing system 310 may include a 5-axes positioner 620, a shape-memory element dispenser 630, and a powder bed 640. The 5-axes positioner 620 may include a gripper to access shape-memory elements provided by the shape-memory element dispenser 630 for insertion into the powder bed 640 at predetermined layers of the additive manufacture process.

As configured by the insertion instructions 610, the 3D printing system 310 may pause additive manufacture of a 3D part at a predetermined layer and cause the 5-axes positioner 620 to access and insert a shape-memory element into the powder bed 640. The insertion position in the powder bed 640 (e.g. insertion coordinates) may also be specified by the insertion instructions 610, and may correspond to a position in the powder bed 640 under which an opening or cavity of a partially-constructed element enclosure is positioned to insert a shape-memory element. As a given 3D part may require multiple support structures, the 3D printing system 310 may pause additive manufacture at different layers respectively to insert a shape-memory element in each of the different detachable support structures constructed for the given 3D part.

Since insertion of a shape-memory element into the powder bed 640 may deform a powder layer, the 3D printing system 310 may perform a recoating operation after insertion of the shape-memory element. However, since the 3D printing system 310 may insert shape-memory elements on a layer-specific basis, in some implementations the 3D printing system 310 need not perform an extra recoating operation to account for the disturbed powder layer. Instead, the 3D printing system 310 may insert a shape-memory element prior to a typical recoating operation that is performed at each layer, and thus leveraging an already-scheduled 3D printing operation to address powder disturbances caused by shape-memory element insertions. After recoating, the 3D printing system 310 may continue the additive manufacture process to construct the next layer in the 3D printed part and accompanying detachable support structures.

In any of the ways described herein, computing systems and 3D printing systems may support the design, manufacture, and use of automatically detachable support structures for 3D printed parts. The detachable support structures disclosed herein may provide automatic and autonomous mechanisms to detach from 3D printed parts, doing so without operator intervention or use of costly and inefficient machining processes. Moreover, through use of shape-memory elements, the automatic support structure detachment features described herein may take advantage of the natural cooling of 3D printed parts and powder beds, and the breaking of element enclosures to detach support structures from part surfaces may occur "naturally" as the 3D printed part cools. Accordingly, the automatic support structure detachment features described herein may increase the efficiency of additive manufacture processes.

Figure 7:
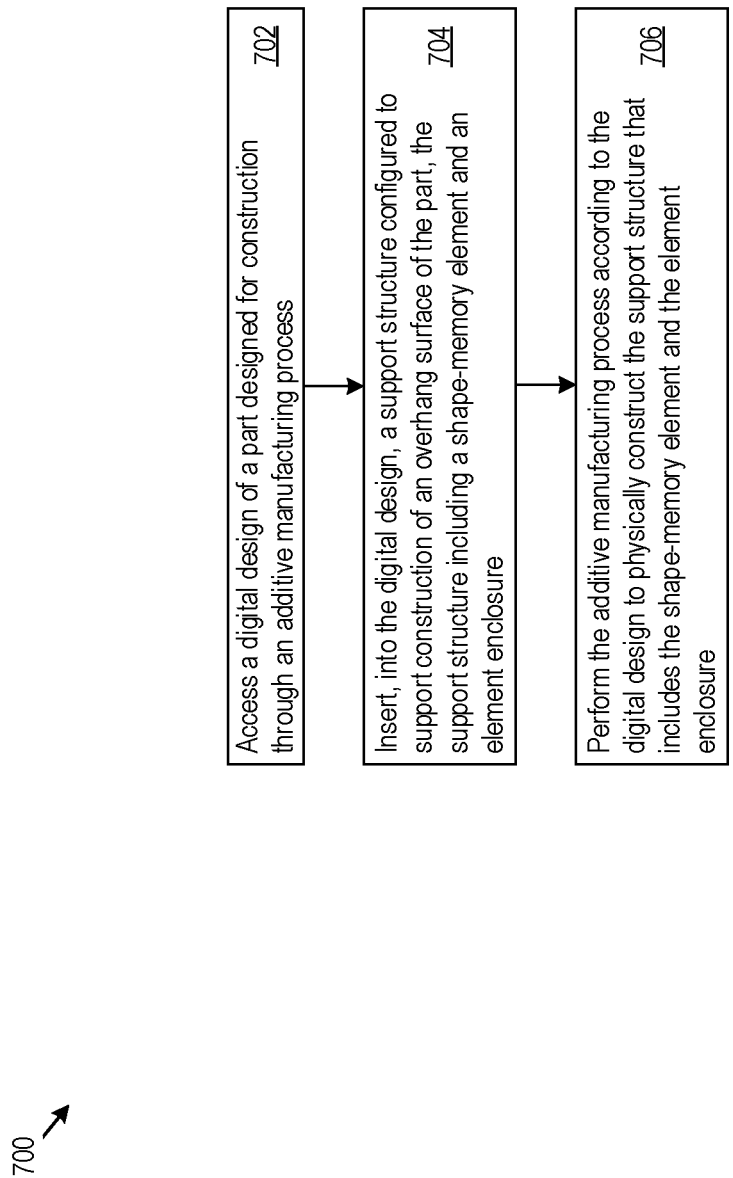
FIG. 7 shows an example of logic that a system may implement to support automatic detachment of support structures for 3D printed parts.

FIG. 7 shows an example of logic 700 that a system may implement to support automatic detachment of support structures for 3D printed parts. For example, the computing system 100 may implement the logic 700 (at least in part) as hardware, executable instructions stored on a machine-readable medium, or as a combination of both. A 3D printing system 310 may implement the logic 700 (at least in part) as printing or computing hardware. The following description of the logic 700 is provided using the design access engine 108, the detachable support structure engine 110, and the 3D printing system 310 as examples. However, various other implementation options by systems are possible.

In implementing the logic 700, the design access engine 108 may access a digital design of a part designed for construction through an additive manufacturing process (702). In implementing the logic 700, the detachable support structure engine 110 may insert, into the digital design, a support structure configured to support construction of a surface of the part, the support structure including a shape-memory element and an element enclosure (704), doing so in any of the ways described herein. The shape-memory element may be configured to be in a diminished shape during the additive manufacturing process and expand into an expanded shape after the addictive manufacturing process ends, and the element enclosure may be attached to the surface of the part and configured to hold the shape-memory element in the diminished shape and break from the part as the shape-memory element expands into the expanded shape. In implementing the logic 700, a 3D printing system may perform the additive manufacturing process according to the digital design to physically construct the support structure that includes the shape-memory element and the element enclosure (706), doing so in any of the ways described herein.

The logic 700 shown in FIG. 7 provides an illustrative example by which a system may support automatic detachment of support structures for 3D printed parts. Additional or alternative steps in the logic 700 are contemplated herein, including according to any features described herein for the design access engine 108, detachable support structure engine 110, 3D printing system 310, or any combinations thereof.

Figure 8:
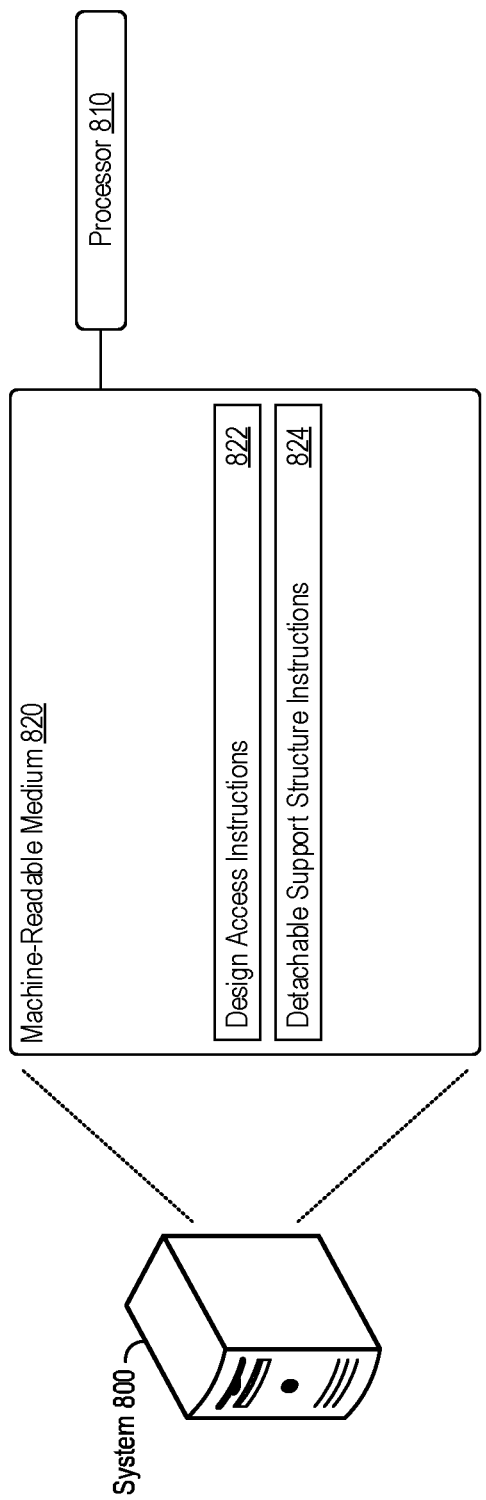
FIG. 8 shows an example of a system that supports automatic detachment of support structures for 3D printed parts.

FIG. 8 shows an example of a system 800 that supports automatic detachment of support structures for 3D printed parts. The system 800 may include a processor 810, which may take the form of a single or multiple processors. The processor(s) 810 may include a central processing unit (CPU), microprocessor, or any hardware device suitable for executing instructions stored on a machine-readable medium. The system 800 may include a machine-readable medium 820. The machine-readable medium 820 may take the form of any non-transitory electronic, magnetic, optical, or other physical storage device that stores executable instructions, such as the design access instructions 822 and the detachable support structure instructions 824 shown in FIG. 8. As such, the machine-readable medium 820 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 800 may execute instructions stored on the machine-readable medium 820 through the processor 810. Executing the instructions (e.g., the design access instructions 822 and/or the detachable support structure instructions 824) may cause the system 800 to perform any of the features described herein, including according to any of the features with respect to the design access engine 108, the detachable support structure engine 110, the 3D printing system 310, or combinations thereof.

For example, execution of the design access instructions 822 by the processor 810 may cause the system 800 to access a digital design of a part designed for construction through an additive manufacturing process. Execution of the detachable support structure instructions 824 by the processor 810 may cause the system 800 to insert, into the digital design, a support structure configured to support construction of a surface of the part. The inserted support structure may include a shape-memory element configured to be in a diminished shape during the additive manufacturing process and expand into an expanded shape after the addictive manufacturing process ends and an element enclosure attached to the surface of the part and configured to hold the shape-memory element in the diminished shape and break from the part as the shape-memory element expands into the expanded shape.

Any additional or alternative features as described herein may be implemented via the design access instructions 822, detachable support structure instructions 824, or a combination of both.

The systems, methods, devices, and logic described above, including the design access engine 108, the detachable support structure engine 110, and the 3D printing system 310, may be implemented in many different ways in many different combinations of hardware, logic, circuitry, and executable instructions stored on a machine-readable medium. For example, the design access engine 108, the detachable support structure engine 110, the 3D printing system 310, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the design access engine 108, the detachable support structure engine 110, 3D printing system 310, or combinations thereof.

The processing capability of the systems, devices, and engines described herein, including the design access engine 108, the detachable support structure engine 110, and the 3D printing system 310, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:
1. A method comprising:
by a computing system:
accessing a digital design of a part designed for construction through an additive manufacturing process;
inserting, into the digital design, a support structure configured to support construction of a surface of the part, wherein the support structure comprises:
a shape-memory element configured to be in a diminished shape during the additive manufacturing process and expand into an expanded shape after the addictive manufacturing process ends; and
an element enclosure attached to the surface of the part and configured to hold the shape-memory element in the diminished shape and break from the part as the shape-memory element expands into the expanded shape,
and wherein expansion of the shape-memory element into the expanded shape causes the element enclosure to break due to force through physical contact with the shape-memory element.

2. The method of claim 1, further comprising configuring the element enclosure to include a weakened structure at a contact point between the element enclosure and the shape-memory element as it expands to control the breaking of the element enclosure from the surface of the part.

3. The method of claim 2, wherein the weakened structure comprises a perforated lining such that the element enclosure is configured to break along the perforated lining as the shape-memory element expands after the manufacturing process.

4. The method of claim 1, wherein the shape-memory element is constructed prior to the additive manufacturing process and the element enclosure is constructed through the additive manufacturing process.

5. The method of claim 1, further comprising generating insertion instructions that control insertion of the shape-memory element during the additive manufacturing process.

6. The method of claim 5, wherein the insertion instructions are configured to, at a predetermined layer of the additive manufacturing process, insert the shape-memory element into the element enclosure prior to completing construction of the element enclosure.

7. The method of claim 1, further comprising, by a 3-dimensional (3D) printing system, manufacturing the part through the additive manufacturing process via the digital design, including by:
constructing the element enclosure via the additive manufacturing process; and
inserting the shape-memory element into the element enclosure at a predetermined layer during construction of the element enclosure.

8. A non-transitory machine-readable medium comprising instructions that, when executed by a processor, cause a system to:
access a digital design of a part designed for construction through an additive manufacturing process;
insert, into the digital design, a support structure configured to support construction of a surface of the part, wherein the support structure comprises:
a shape-memory element configured to be in a diminished shape during the additive manufacturing process and expand into an expanded shape after the additive manufacturing process ends; and
an element enclosure attached to the surface of the part and configured to hold the shape-memory element in the diminished shape and break from the part as the shape-memory element expands into the expanded shape,
and wherein expansion of the shape-memory element into the expanded shape causes the element enclosure to break due to force through physical contact with the shape-memory element.

9. The non-transitory machine-readable medium of claim 8, wherein the instructions further cause the system to configure the element enclosure to include a weakened structure at a contact point between the element enclosure and the shape-memory element as it expands to control the breaking of the element enclosure from the surface of the part.

10. The non-transitory machine-readable medium of claim 9, wherein the weakened structure comprises a perforated lining such that the element enclosure is configured to break along the perforated lining as the shape-memory element expands after the manufacturing process.

11. The non-transitory machine-readable medium of claim 8, wherein the shape-memory element is constructed prior to the additive manufacturing process and the element enclosure is constructed through the additive manufacturing process.

12. The non-transitory machine-readable medium of claim 8, wherein the instructions further cause the system to generate insertion instructions that control insertion of the shape-memory element during the additive manufacturing process, wherein the insertion instructions are configured to, at a predetermined layer of the additive manufacturing process, insert the shape-memory element into the element enclosure prior to completing construction of the element enclosure.

13. The non-transitory machine-readable medium of claim 8, wherein the instructions further cause a 3-dimensional (3D) printing system to manufacture the part through the additive manufacturing process via the digital design, including by:
constructing the element enclosure via the additive manufacturing process; and
inserting the shape-memory element into the element enclosure at a predetermined layer during construction of the element enclosure.

* * * * *